US012706903B2

(12) United States Patent
Yarabolu et al.

(10) Patent No.: US 12,706,903 B2
(45) **Date of Patent: *Aug. 11, 2026**

(54) LOCAL HASH SALT TO PREVENT CREDENTIAL STUFFING ATTACKS

(71) Applicant: Bank of America Corporation, Charlotte, NC (US)

(72) Inventors: Vijay Kumar Yarabolu, Telangana (IN); Gowthaman Sundararaj, Tamilnadu (IN)

(73) Assignee: Bank of America Corporation, Charlotte, NC (US)

( * ) Notice: Subject to any disclaimer, the term of this patent is extended or adjusted under 35 U.S.C. 154(b) by 47 days.

This patent is subject to a terminal disclaimer.

(21) Appl. No.: 19/014,468

(22) Filed: Jan. 9, 2025

(65) Prior Publication Data

US 2025/0150448 A1 May 8, 2025

Related U.S. Application Data

(63) Continuation of application No. 18/093,003, filed on Jan. 4, 2023, now Pat. No. 12,238,088.

(51) Int. Cl.
*H04L 9/40* (2022.01)

(52) U.S. Cl.
CPC .......... *H04L 63/083* (2013.01); *H04L 63/061* (2013.01); *H04L 63/0861* (2013.01)

(58) Field of Classification Search
CPC .. H04L 63/083; H04L 63/061; H04L 63/0861
See application file for complete search history.

(56) References Cited

U.S. PATENT DOCUMENTS

| | | | |
|---|---|---|---|
| 7,228,417 | B2 | 6/2007 | Roskind |
| 11,265,148 | B1 | 3/2022 | Griffin et al. |
| 11,291,921 | B1 | 4/2022 | Schindler et al. |
| 11,356,244 | B2 | 6/2022 | Yarabolu |
| 11,366,928 | B2 | 6/2022 | Goel et al. |
| 11,379,606 | B2 | 7/2022 | Wang |
| 11,386,372 | B2 | 7/2022 | Koppel et al. |
| 11,398,907 | B1 | 7/2022 | Fodere et al. |

(Continued)

OTHER PUBLICATIONS

Nov. 13, 2024—(US) Notice of Allowance—U.S. Appl. No. 18/093,003.

*Primary Examiner* — Izunna Okeke
(74) *Attorney, Agent, or Firm* — Banner & Witcoff, Ltd.

(57) ABSTRACT

Aspects of the disclosure relate to authentication. A computing platform may send, to a wearable device, an internet of things (IoT) vector key. The computing platform may receive an application access request from the wearable device, which may include authentication credentials. The computing platform may send, to the wearable device, a reference key comprising a sequence of row-column combinations corresponding to the IoT vector key, and the wearable device may be configured to identify a hash salt value using the reference key and the IoT. The computing platform may receive, from the wearable device, the hash salt value. The computing platform may generate, based on the hash salt value and the authentication credentials, a password. The computing platform may hash the password to produce a password hash, and may send the password hash to an application server for validation.

19 Claims, 12 Drawing Sheets

(56) References Cited

U.S. PATENT DOCUMENTS

| | | | | |
|---|---|---|---|---|
| 11,405,211 | B2 | 8/2022 | Yarabolu | |
| 11,405,377 | B2 | 8/2022 | Bhargava et al. | |
| 11,409,709 | B1 | 8/2022 | Capello et al. | |
| 11,412,373 | B2 | 8/2022 | Medwed et al. | |
| 11,431,476 | B2 | 8/2022 | Brown et al. | |
| 11,438,378 | B1 | 9/2022 | Dell'Amico | |
| 11,463,260 | B2 | 10/2022 | Chan | |
| 2015/0070134 | A1* | 3/2015 | Nagisetty | G07C 9/28 340/5.61 |
| 2017/0346853 | A1* | 11/2017 | Wyatt | H04L 43/12 |
| 2018/0205544 | A1 | 7/2018 | Norton | |
| 2021/0224808 | A1 | 7/2021 | Al-Ansari et al. | |
| 2021/0248616 | A1 | 8/2021 | Foster | |
| 2021/0326432 | A1 | 10/2021 | Kaidi | |
| 2021/0365433 | A1 | 11/2021 | Heo et al. | |
| 2022/0269816 | A1 | 8/2022 | Qian et al. | |
| 2022/0327882 | A1 | 10/2022 | Komo et al. | |
| 2022/0345459 | A1 | 10/2022 | Tseng et al. | |

* cited by examiner

505

| Row x Column | N x N Data Vector for IoT Device | | | | | | | | | |
|---|---|---|---|---|---|---|---|---|---|---|
| Index | A | B | C | D | E | F | G | H | I | J |
| 0 | A | 2 | Z | N | 0 | 4 | 1 | K | Y | I |
| 1 | L | 9 | F | N | R | C | C | 2 | 8 | 7 |
| 2 | 1 | U | O | N | 9 | 2 | K | 4 | S | D |
| 3 | D | 5 | 9 | 3 | 6 | A | C | X | F | 2 |
| 4 | L | 8 | K | I | 5 | Q | T | Z | 4 | 0 |
| 5 | 9 | 8 | L | 0 | 2 | 3 | 7 | 1 | 6 | F |
| 6 | T | P | 4 | 3 | 0 | J | U | 6 | 8 | R |
| 7 | J | 7 | N | T | T | 4 | 3 | G | B | 8 |
| 8 | 2 | P | A | S | P | J | D | M | 5 | F |
| 9 | R | W | M | V | 5 | R | 1 | 3 | 2 | 6 |

| Sample 12 Digit Reference Key | A5 | D8 | C3 | I4 | J0 | D6 | G1 | I8 | B7 | H3 | E6 | F5 |
|---|---|---|---|---|---|---|---|---|---|---|---|---|
| Derived Hash Salt | 9 | S | 9 | 4 | 4 | 3 | C | 5 | 7 | X | 0 | 3 |

FIG. 6

LOCAL HASH SALT TO PREVENT CREDENTIAL STUFFING ATTACKS

CROSS REFERENCE TO RELATED APPLICATION

This application claims priority to and is a Continuation of U.S. Ser. No. 18/093,003, filed on Jan. 4, 2023, and titled "Local Hash Salt to Prevent Credential Stuffing Attacks." The related application is incorporated by reference herein in its entirety for all purposes.

BACKGROUND

Aspects of the disclosure relate to computer hardware and software improved password security. In some instances, various applications and/or services may be password protected. In order to simplify the process for remembering such passwords, individuals may use the same or similar passwords for multiple different applications. In these instances, however, if a single password is exposed to an attacker, the remaining applications may similarly be exposed to the attacker. In contrast, if multiple different passwords are used, individuals may frequently forget the password for a given application. In these instances, attempting the wrong password too many times may lead to an account lockout. Accordingly, it may be important to provide improved password protection without detracting from the user experience.

SUMMARY

Aspects of the disclosure provide effective, efficient, scalable, and convenient technical solutions that address and overcome the technical problems associated with application authentication. In accordance with one or more embodiments of the disclosure, a computing platform comprising at least one processor, a communication interface, and memory storing computer-readable instructions may send, to a wearable device, an internet of things (IoT) vector key comprising an N×N matrix of values for a client. The computing platform may receive an application access request from the wearable device, which may include authentication credentials. The computing platform may send, to the wearable device, a reference key comprising a sequence of row-column combinations corresponding to the IoT vector key, where the wearable device may be configured to identify a hash salt value by identifying the values, in the IoT vector key, corresponding to the sequence of row-column combinations defined in the reference key. The computing platform may receive, from the wearable device, the hash salt value. The computing platform may generate, based on the hash salt value and the authentication credentials, a password. The computing platform may hash the password to produce a password hash. The computing platform may send the password hash to an application server, where the application server may be configured to validate the password hash by comparing the password hash to a reference password hash and grant the wearable device access to the application based on successful validation.

In one or more instances, the IoT vector key may be stored at the application server and the wearable device. In one or more instances, the authentication credentials may include one or more of: an alphanumeric passcode, biometric input, a retina scan, or a facial scan.

In one or more examples, the reference key may be generated by the application server and stored at the application server. In one or more examples, the application server may be configured to generate the reference password hash by: 1) generating, based on the reference key and the IoT vector key, the hash salt value; 2) generating, based on the authentication credentials and the hash salt value, the password; and 3) hashing the password to produce the reference password hash.

In one or more instances, the authentication credentials may be shared among a plurality of applications accessible at the computing platform. In one or more instances, a plurality of wearable devices, including the wearable device, may be configured to access the plurality of applications.

In one or more examples, the password may be further generated based on a second hash salt value, received from a different wearable device. In one or more examples, the reference key may be specific to the application, a second reference key may be assigned to a second application, the authentication credentials for the application and the second application may be the same, and the password hashes for the application and the second application may be different.

In one or more instances, the application server may be configured to update, after validating the password hash, the IoT vector key and provide, to the computing platform, the updated IoT vector key, where the computing platform may distribute the updated IoT vector key to the wearable device for storage and use in subsequent application access requests.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 5 and 6 depict illustrative diagrams for using a local hash salt to prevent credential stuffing attacks in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, systems and methods for improved application security and authentication are described herein. For example, many enterprise organizations operate, at least in part, online. Accordingly, people may be inclined to use digital services for banking, transportation booking, hotel reservations, managing funds, and/or otherwise. In these instances, however, customers may have to remember passwords associated with each of these applications. In some instances, if a user has a banking relationship with multiple financial institutions, they may use the same password for each to avoid having to remember different passwords. For example, if the wrong password is used too many times, the customer may experience an account lockout. In these instances, however, if one application password is exposed to an attacker, the attacker may gain access to all the remaining applications (e.g., as the password is the same for all applications). This may be referred to as a password stuffing attack. Described herein is a method for adding uniqueness to passwords without additional friction.

For example, upon successful multifactor authentication, a server may generate a one time use authentication token and an N×N data vector, and may send both to a user device (such as a wearable device). The server may store both the values for future reference. The user device may store the authentication token and the N×N data vector that are received from server.

During authentication, the server may request the authentication token from the user device. Upon successful validation, the server may send a random reference array of the N×N vector to the user device. The user device may use the reference array and extract corresponding vector values that may act as a cryptographic hash salt to create a unique hash at every login.

This may result in a rotatable one-time-use hash salt at the user end rather than the server. Additionally, a unique password hash may be generated for every app despite using the same password by the customer. Furthermore, no additional friction may be experienced by the customer, and the customer may be able to use a common password for multiple applications.

Figure 1A:
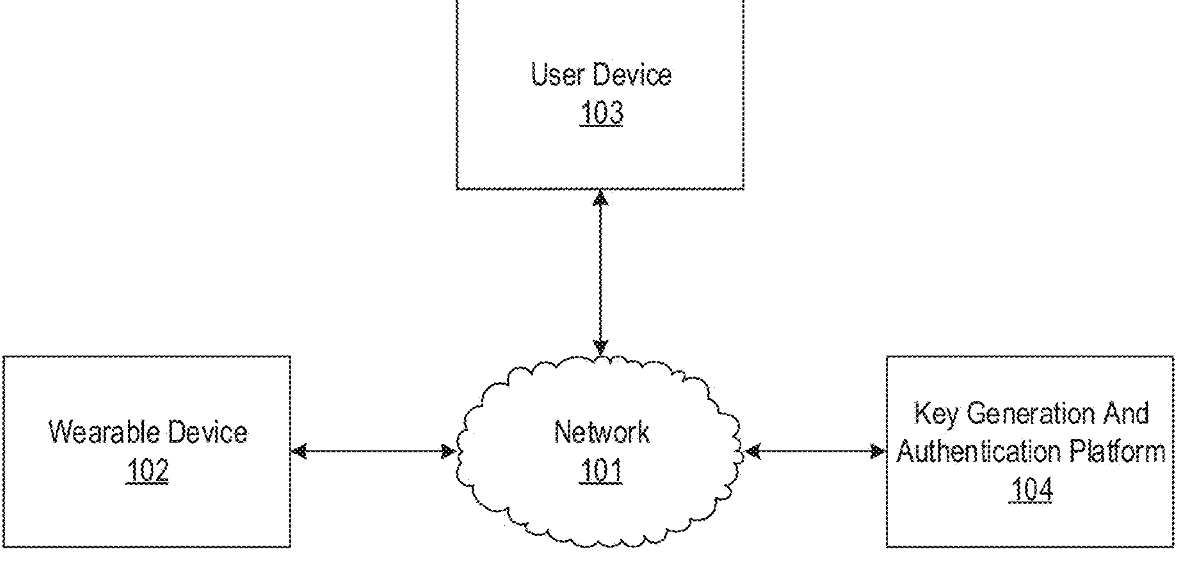
FIGS. 1A-1B depict an illustrative computing environment for using a local hash salt to prevent credential stuffing attacks in accordance with one or more example embodiments.
Figure 1B:
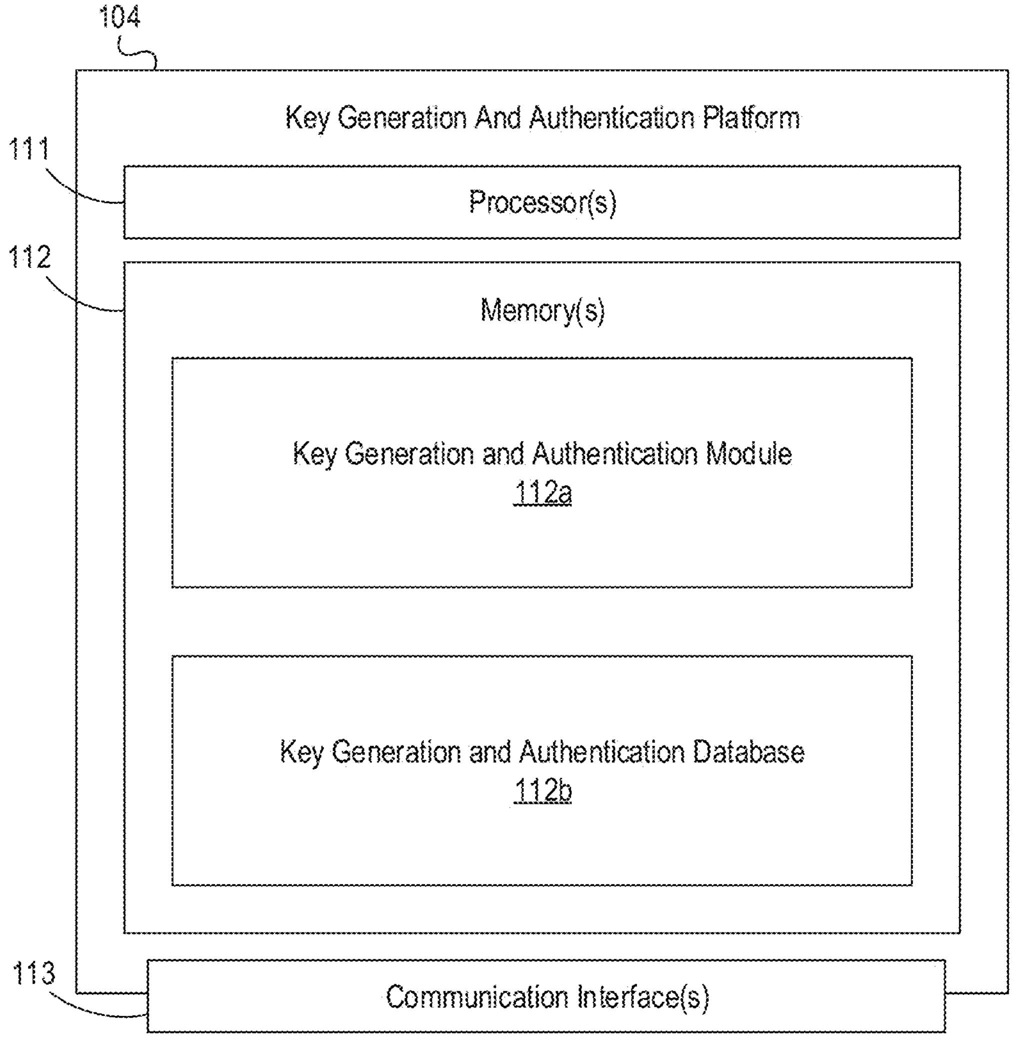

FIGS. 1A-1B depict an illustrative computing environment for using a local hash salt to prevent credential stuffing attacks in accordance with one or more example embodiments. Referring to FIG. 1A, computing environment 100 may include one or more computer systems. For example, computing environment 100 may include a wearable device 102, a user device 103, and a key generation and authentication platform 104.

Wearable device 102 may be and/or otherwise include a smart watch, fitness tracker, biometric monitor, smart ring, and/or other wearable and/or internet of things (IoT) device that may be used by an individual to access an application (which may, e.g., also be accessed by a primary user device such as the user device 103). In some instances, the wearable device 102 may be configured to display one or more user interfaces (e.g., application interfaces, or the like). Although a single wearable device 102 is shown, any number of wearable devices may be deployed in the systems and methods described below without departing from the scope of the disclosure. Furthermore, although a wearable device is described, in some instances, any other device may be deployed without departing from the scope of the disclosure (e.g., smartphone, tablet, and/or other device).

User device 103 may be and/or otherwise include a laptop computer, desktop computer, mobile device, tablet, smartphone, and/or other device that may be used by an individual to access an application (that may e.g., similarly be accessed by one or more wearable devices such as wearable device 102). In some instances, the user device 103 may be configured to synchronize with the wearable device 102. In some instances, user device 103 may be configured to display one or more user interfaces (e.g., application interfaces, or the like). Although a single user device 103 is shown, any number of user devices may be deployed in the systems/methods described below without departing from the scope of the disclosure.

As described further below, key generation and authentication platform 104 may be a computer system that includes one or more computing devices (e.g., servers, server blades, or the like) and/or other computer components (e.g., processors, memories, communication interfaces) that may be used to provide vector key generation and/or password hash verification services as described further below.

Computing environment 100 also may include one or more networks, which may interconnect wearable device 102, user device 103, and/or key generation and authentication platform 104. For example, computing environment 100 may include a network 101 (which may interconnect, e.g., wearable device 102, user device 103, and/or key generation and authentication platform 104).

In one or more arrangements, wearable device 102, user device 103, and key generation and authentication platform 104 may be any type of computing device capable of sending and/or receiving requests and processing the requests accordingly. For example, wearable device 102, user device 103, key generation and authentication platform 104 and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of user device wearable device 102, user device 103, and/or key generation and authentication platform 104 may, in some instances, be special-purpose computing devices configured to perform specific functions.

Referring to FIG. 1B, key generation and authentication platform 104 may include one or more processors 111, memory 112, and communication interface 113. A data bus may interconnect processor 111, memory 112, and communication interface 113. Communication interface 113 may be a network interface configured to support communication between key generation and authentication platform 104 and one or more networks (e.g., network 101, or the like). Memory 112 may include one or more program modules having instructions that when executed by processor 111 cause key generation and authentication platform 104 to perform one or more functions described herein and/or one or more databases that may store and/or otherwise maintain information which may be used by such program modules and/or processor 111. In some instances, the one or more program modules and/or databases may be stored by and/or maintained in different memory units of key generation and authentication platform 104 and/or by different computing devices that may form and/or otherwise make up key generation and authentication platform 104. For example, memory 112 may have, host, store, and/or include key generation and authentication module **112*a* and key generation and authentication database 112*b***.

Key generation and authentication module **112*a* may have instructions that direct and/or cause key generation and authentication platform 104 to provide improved application security and authentication mechanisms, as discussed in greater detail below. Key generation and authentication database 112***b* may store information used by key generation and authentication module 112*a* and/or key generation and authentication platform 120 in application of advanced techniques to provide improved application security and authentication mechanisms, and/or in performing other functions.

Figure 2A:
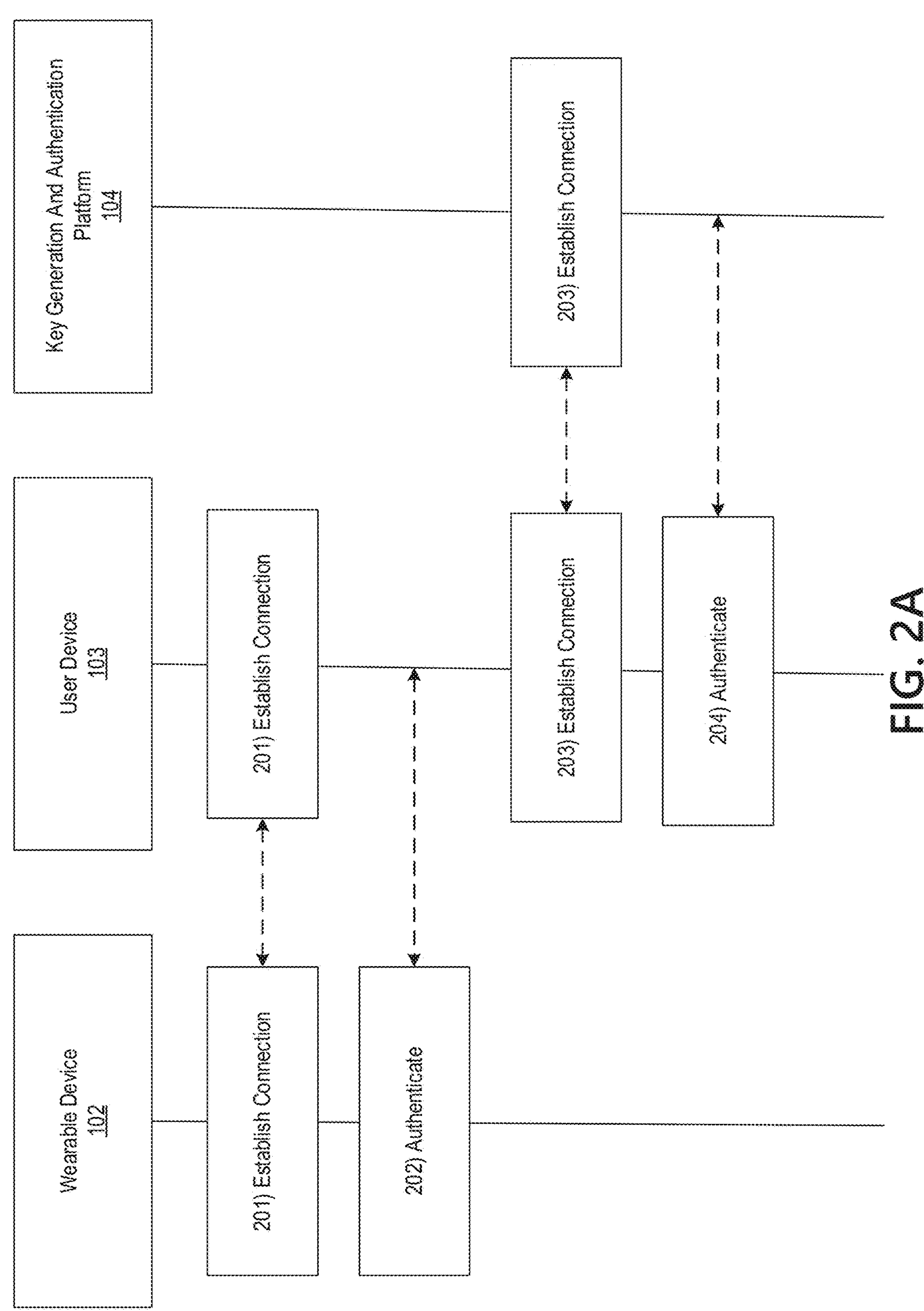
FIGS. 2A-2G depict an illustrative event sequence for using a local hash salt to prevent credential stuffing attacks in accordance with one or more example embodiments.

FIGS. 2A-2G depict an illustrative event sequence for use of a local hash salt to prevent credential stuffing attacks in accordance with one or more example embodiments. Referring to FIG. 2A, at step 201, the wearable device 102 may establish a connection with the user device 103. For example, the wearable device 102 may establish a first wireless data connection with the user device 103 to link the wearable device 102 to the user device 103 (e.g., in preparation for authenticating with the user device 103). In some instances, the wearable device 102 may identify whether or not a connection is already established with the user device 103. If a connection is already established with the If a connection is not yet established with the user device 103, the wearable device 102 may establish the first wireless data connection as described herein.

At step 202, the wearable device 102 may authenticate to the user device 103. For example, the wearable device 102 may authenticate to the user device 103 while the first wireless data connection is established. For example, the wearable device 102 may provide an authentication token and/or other credentials to the user device 103 to register the wearable device 102 with the user device 103. By authenticating the wearable device 102, the user device 103 may configure the wearable device 102 for communication with the user device 103.

At step 203, the user device 103 may establish a connection with the key generation and authentication platform 104. For example, the user device 103 may establish a second wireless data connection with the key generation and authentication platform 104 to link the user device 103 with the key generation and authentication platform 104 (e.g., in preparation for authenticating to the key generation and authentication platform 104). In some instances, the user device 103 may identify whether or not a connection is already established with the key generation and authentication platform 104. If a connection is already established with the key generation and authentication platform 104, the user device 103 might not re-establish the connection. If the connection is not yet established with the key generation and authentication platform 104, the user device 103 may establish the second wireless data connection as described herein.

At step 204, the user device 103 may authenticate to the key generation and authentication platform 104. For example, the user device 103 may authenticate to the key generation and authentication platform 104 while the second wireless data connection is established. In some instances, the user device 103 may authenticate to the key generation and authentication platform 104 by providing an authentication token (which may be the same as the token received from the wearable device 102, or may be a different token), and/or other credentials. In these instances, the key generation and authentication platform 104 may validate the user device 103 by comparing the authentication token to a stored authentication token. If the key generation and authentication platform 104 successfully validates the user device 103, the key generation and authentication platform 104 may proceed to step 205. Otherwise, the key generation and authentication platform 104 may continue to wait until a valid authentication token has been received. In validating the user device 103, the key generation and authentication platform 104 may configure the user device 103 for communication with the key generation and authentication platform 104.

Figure 2B:
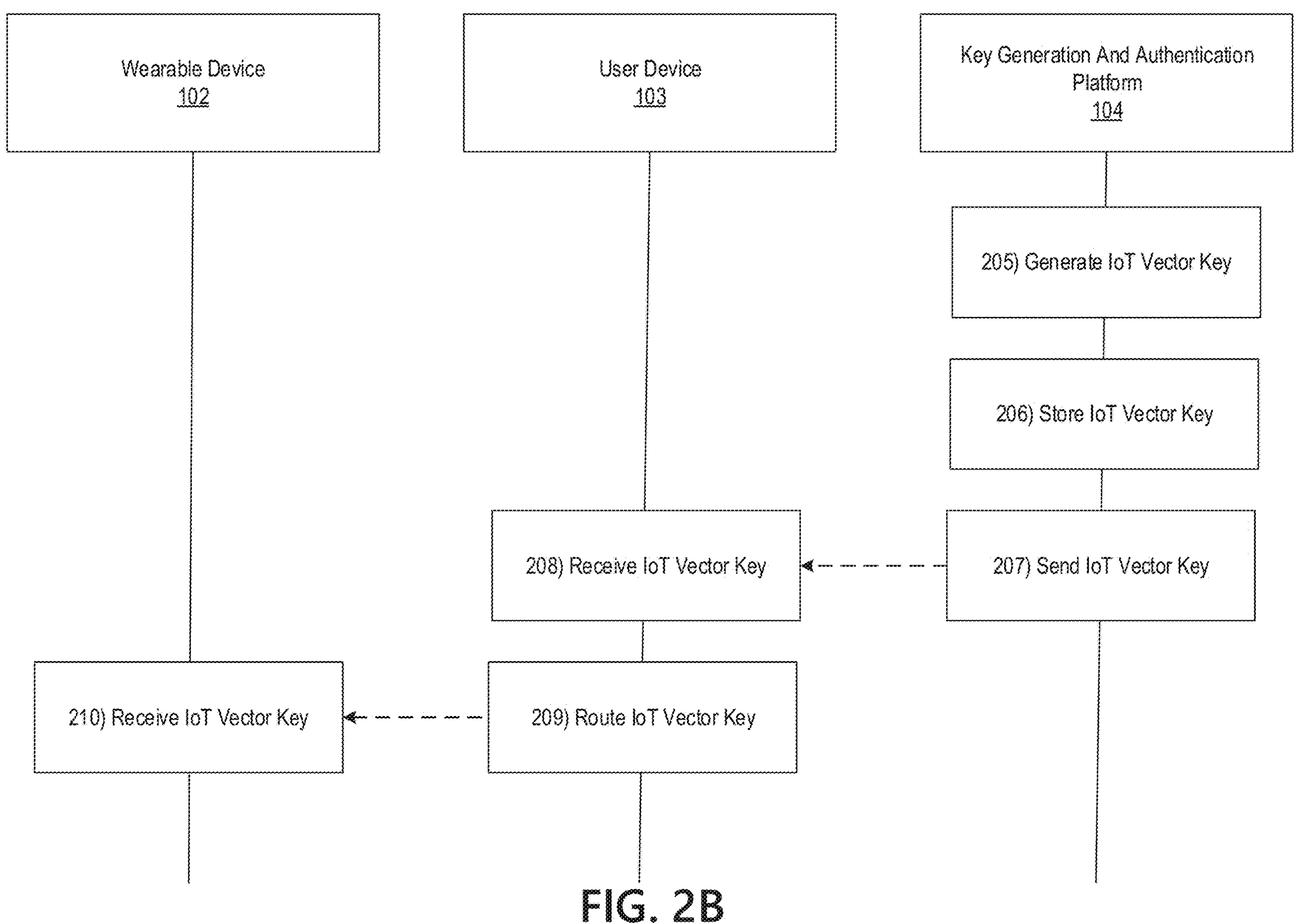

Referring to FIG. 2B, at step 205, the key generation and authentication platform 104 may generate an IoT vector key for the user device 103. For example, the key generation and authentication platform 104 may generate a matrix similar to the IoT vector key 505, which is shown in FIG. 5, which may be an N×N vector matrix that includes a plurality of hash salt values, each defined by a row/column intersection within the N×N vector matrix. For example, as shown in the IoT vector key 505, the intersection of row 4 and column B may have a corresponding hash salt value of 8.

At step 206, the key generation and authentication platform 104 may store the IoT vector key, generated at step 206. For example, the key generation and authentication platform 104 may store the IoT vector key in an application database, which may, e.g., include a stored correlation between the IoT vector key and the user device 103. By storing the IoT vector key, the key generation and authentication platform 104 may enable future password verification as described further below.

At step 207, the key generation and authentication platform 104 may send the IoT vector key to the user device 103. For example, the key generation and authentication platform 104 may send the IoT vector key to the user device 103 via the communication interface 113 and while the second wireless data connection is established.

At step 208, the user device 103 may receive the IoT vector key send at step 207. For example, the user device 103 may receive the IoT vector key while the second wireless data connection is established.

At step 209, the user device 103 may route the IoT vector key to the wearable device 102. For example, the user device 103 may route the IoT vector key to the wearable device 102 while the first wireless data connection is established.

At step 210, wearable device 102 may receive the IoT vector key sent at step 209. For example, the wearable device 102 may receive the IoT vector key while the second wireless data connection is established.

Figure 2C:
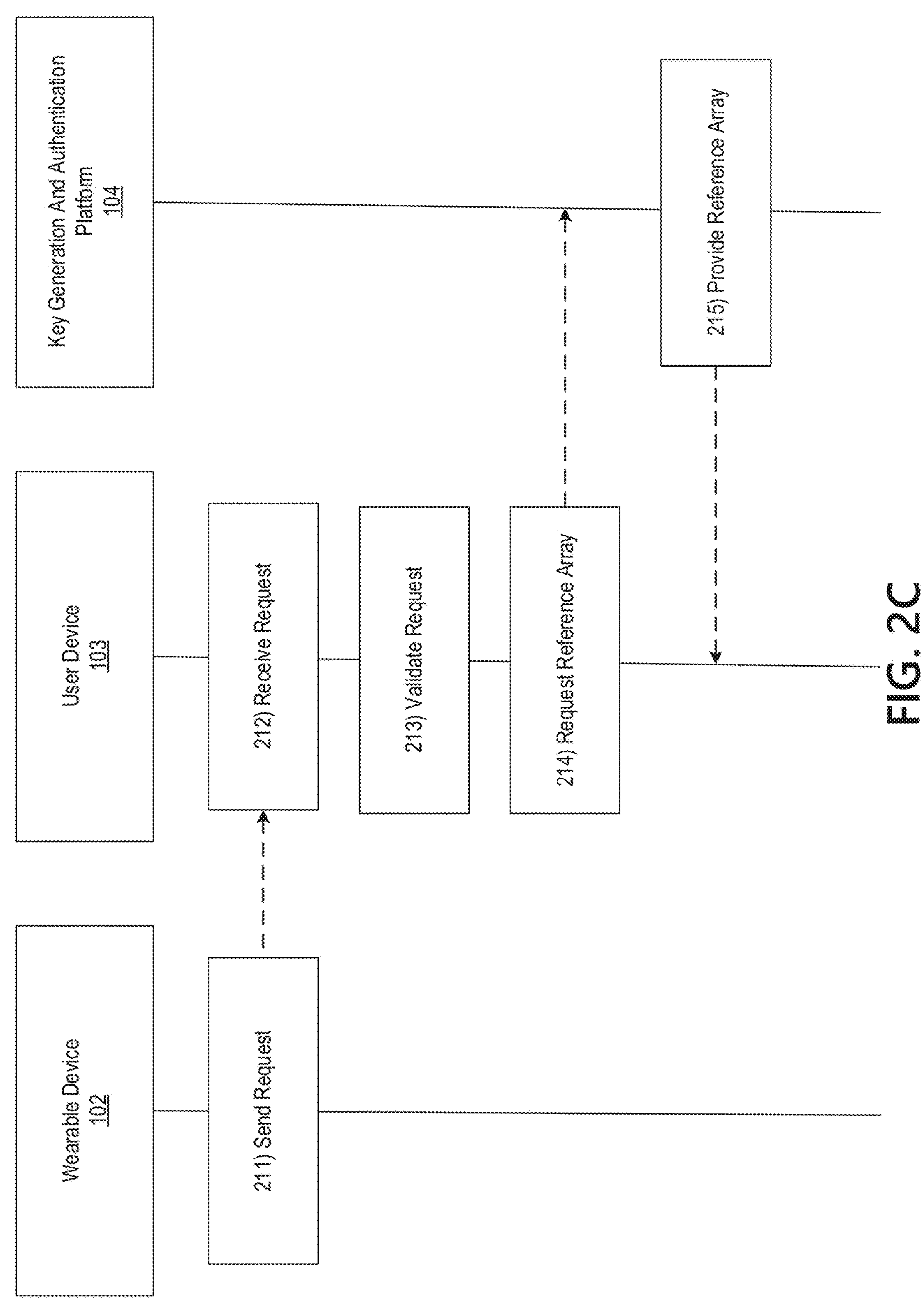

Referring to FIG. 2C, at step 211, the wearable device 102 may send an application access request to the user device 103. For example, the wearable device 102 may send, after receiving the IoT vector key, a request to access one or more applications hosted by the wearable device 102 and/or user device 103. In some instances, the wearable device 102 may send the application access request to the user device 103 while the first wireless data connection is established. In some instances, the wearable device 102 may send, along with the application access request, the authentication token and/or other authentication credentials (e.g., a numeric passcode, alphanumeric passcode, biometric input, retina scan, facial scan, and/or other credentials). In some instances, the authentication credentials may be shared among one or more different applications accessible by the wearable device 102 and/or the user device 103. For example, the user may have a single password, which may, e.g., be used to access a plurality of different applications. In this example, however, as is described further below, the ultimate password hash derived for each application may be different regardless of the use of a common seed password.

At step 212, the user device 103 may receive the application access request sent at step 211. For example, the user device 103 may receive the application access request while the first wireless data connection is established.

At step 213, the user device 103 may validate the application access request. For example, the user device 103 may validate that the wearable device 102 is configured for communication with the user device 103, that a valid authentication token was presented, prompt a user for multifactor authentication credentials (e.g., password, biometric input, and/or otherwise), and/or otherwise validate the application access request. If the application access request is validated, the user device 103 may proceed to step 214. Otherwise, the user device 103 may wait until a valid application access request is received.

At step 214, based on successfully validating the application access request, the user device 103 may request a reference array from the key generation and authentication platform 104. For example, the user device 103 may request the reference array while the second wireless data connection is established.

At step 215, the key generation and authentication platform 104 may generate the requested reference array, and send the reference array to the user device 103. For example, the key generation and authentication platform 104 may generate a reference array similar to the sample 12 digit reference key illustrated in table 605 of FIG. 6. More specifically, the key generation and authentication platform 104 may generate a sequence of row/column combinations corresponding to the IoT vector key (e.g., A5, D8, C3, or the like). In some instances, the key generation and authentication platform 104 may send the reference array to the user device 103 while the second wireless data connection is established. In some instances, the reference array may be specific to the application requested at step 211. For example, the key generation and authentication platform 104 may generate application specific reference arrays for each application accessible by the wearable device 102 and/or the user device 103. In doing so, the key generation and authentication platform 104 may enable the use of a common password to be used across multiple applications by creating, through the use of the application specific reference arrays, different salt values for each application. When combined with the common password, these different salt values may enable the generation of unique password hashes for each application that may be used for authentication.

By providing the IoT vector key to a plurality of wearable devices (including the wearable device 102), and subsequently producing a reference array specific to a requested application, any number of different wearable devices may be used to support the authentication measures described herein (e.g., because any wearable device may provide the reference array salt values corresponding to the reference array by accessing a stored IoT vector key).

In some instances, the reference array may be specific to the application access request. For example, if subsequent access to the application is requested, a different reference array, specific to the subsequent access request, may be generated and provided to the wearable device 102 (and/or other wearable devices).

Figure 2D:
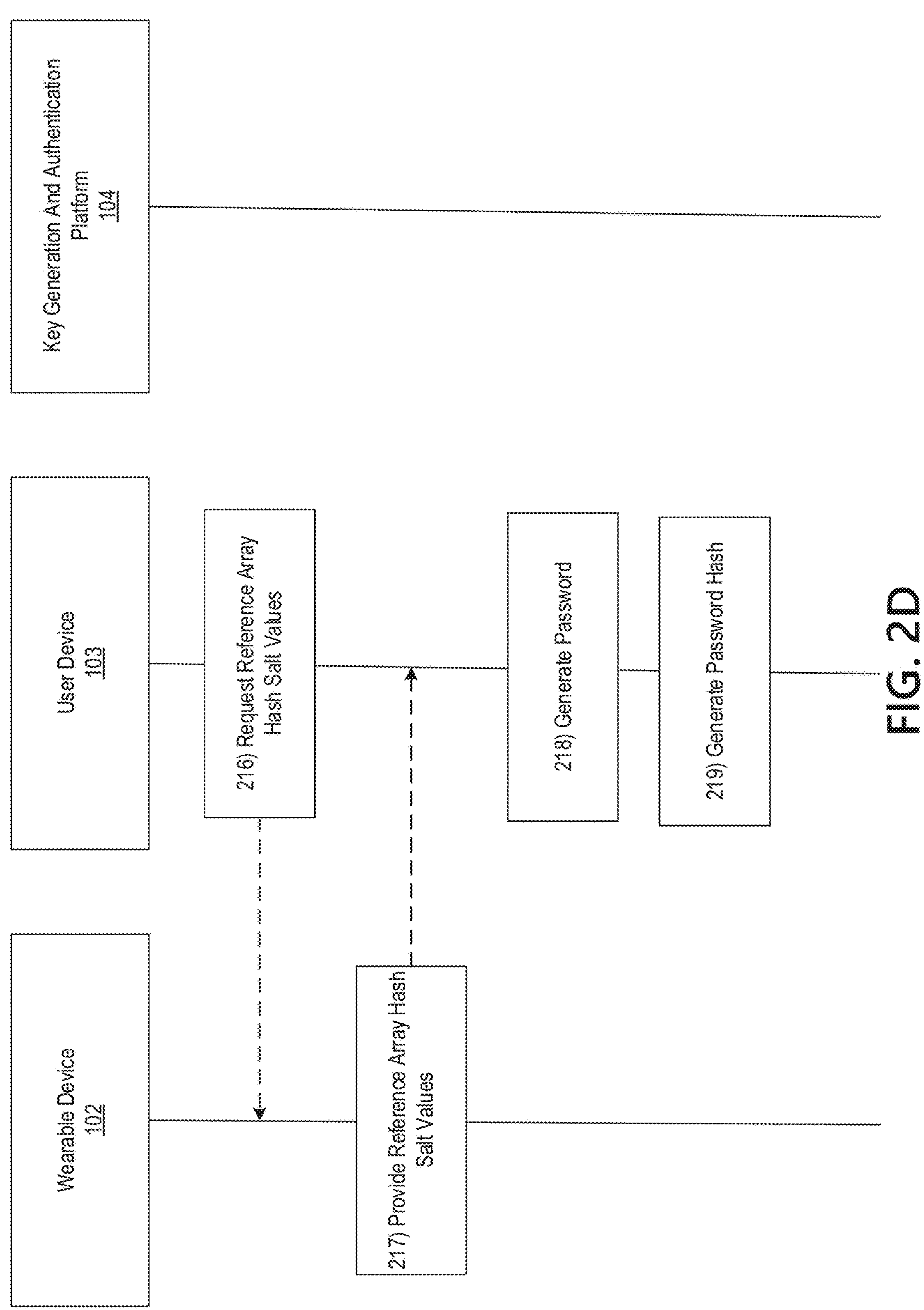

With reference to FIG. 2D, at step 216, the user device 103 may request, from the wearable device 102, the reference array hash salt values. For example, the user device 103 may send a request to the wearable device 102 to identify the hash salt values, included in the IoT vector key, corresponding to the reference array (e.g., as shown in the derived hash salt of table 605 of FIG. 6). For example, the user device 103 may request the reference array hash salt values while the first wireless data connection is established.

At step 217, the wearable device 102 may identify the reference array hash salt values corresponding to the reference array. For example, the wearable device 102 may use the stored IoT vector key to identify values corresponding to the row/column combinations provided in the reference array. In doing so, the wearable device 102 may produce reference array hash salt values corresponding to the derived hash salt of table 605 in FIG. 6. Then the wearable device 102 may send the reference array hash salt values to the user device 103 (e.g., while the first wireless data connection is established).

At step 218, the user device 103 may generate a modified password corresponding to the application access request. For example, the user device 103 may concatenate and/or otherwise combine the reference array hash salt values with the user authentication credentials previously received (e.g., a password, biometric identifier, and/or other information). For example, the user device 103 may produce a modified password that comprises "password.derivedhashsalt."

At step 219, the user device 103 may hash the modified password, produced at step 218, to produce a password hash. For example, the user device 103 may hash the modified password of "password.derivedhashsalt" to produce "passwordhash."

Although obtaining reference array hash salt values from a single wearable device 102 is described, any number of salt values may be obtained from any number of single wearable devices without departing from the scope of this disclosure. For example, a modified password of "password.derivedhashsalt1.derivedhashsalt2" may be produced by obtaining hash salt values from a pair of wearable devices.

Figure 2E:
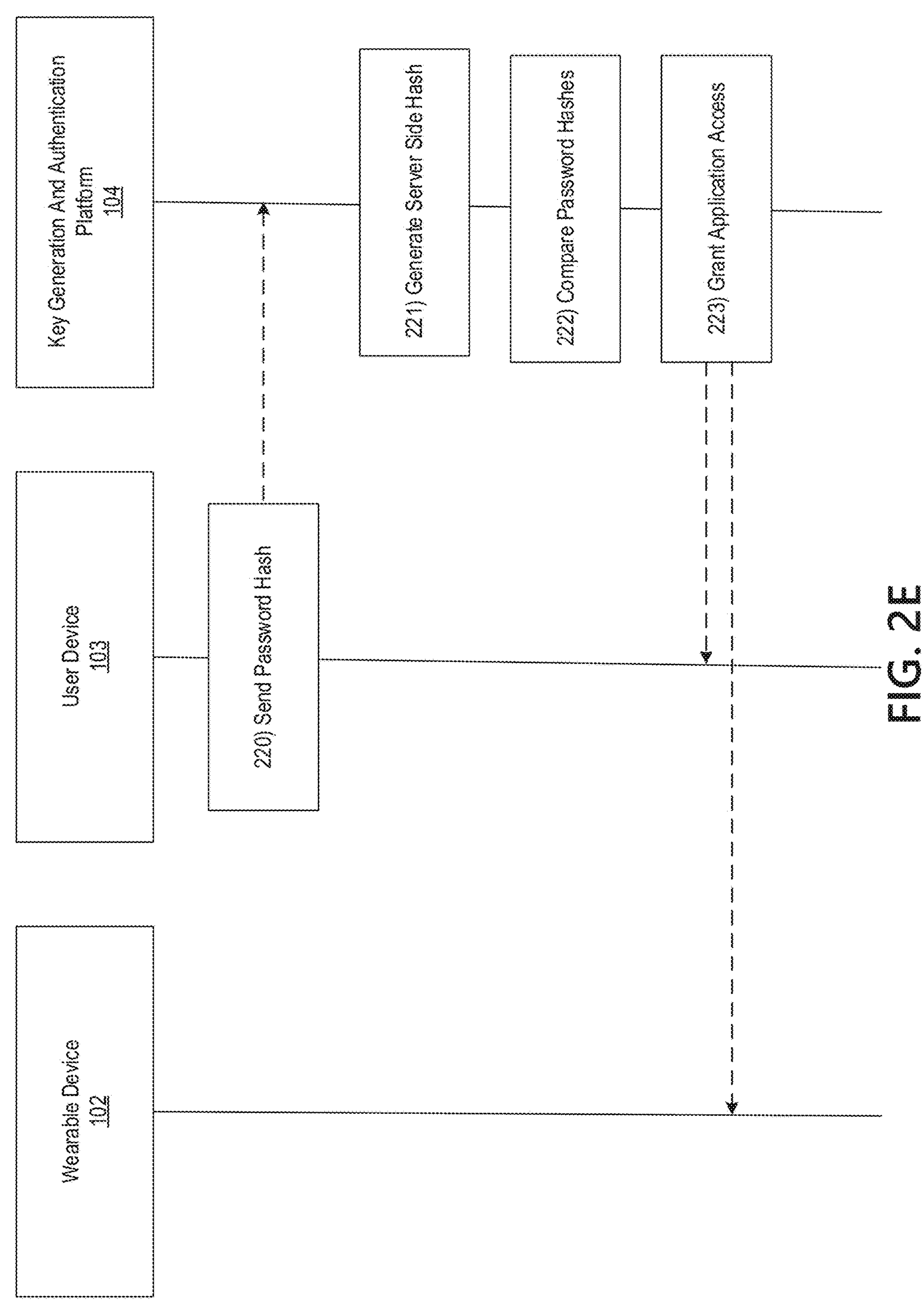

Referring to FIG. 2E, at step 220, the user device 103 may send the password hash to the key generation and authentication platform 104. For example, the user device 103 may send the password hash to the key generation and authentication platform 104 while the second wireless data connection is established.

At step 221, the key generation and authentication platform 104 may generate a server side password hash. For example, the key generation and authentication platform 104 may perform actions similar to those described above with regard to steps 217 to derive the reference array hash salt values, password, and password hash.

At step 222, the key generation and authentication platform 104 may compare the password hash received from the user device 103 to the server side hash produced at step 221. Based on identifying that the password hashes match, the key generation and authentication platform 104 may proceed to step 223. Otherwise, if the password hashes do not match, the key generation and authentication platform 104 may proceed to step 230. At step 223, the key generation and authentication platform 104 may grant access to the requested application to the wearable device 102 and/or the user device 103.

Figure 2F:
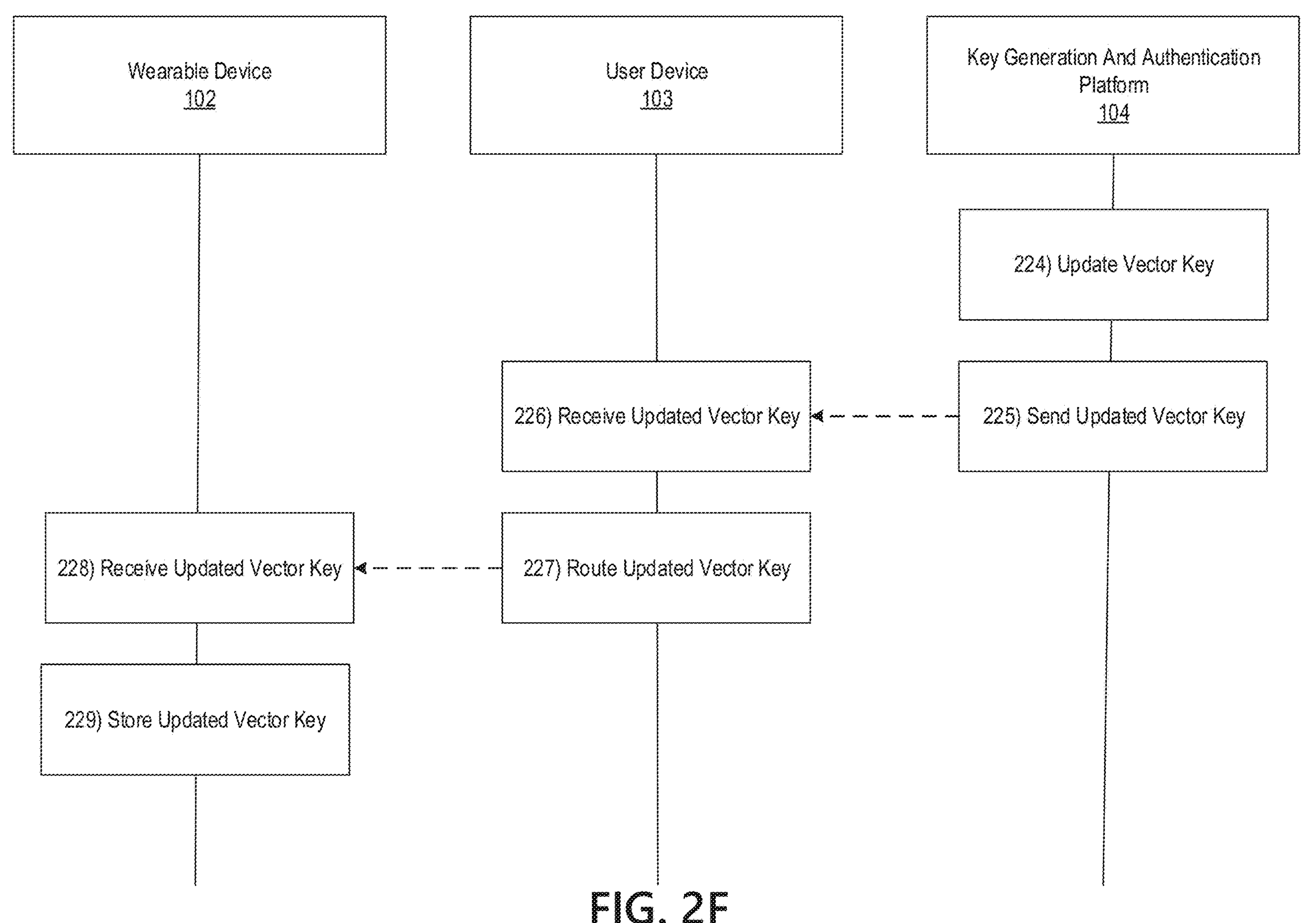

Referring to FIG. 2F, at step 224, after granting access to the requested application, the key generation and authentication platform 104 may update the IoT vector key. For example, the key generation and authentication platform 104 may generate an updated version of the N×N vector matrix generated at step 205.

At step 225, the key generation and authentication platform 104 may store and send the updated IoT vector key. For example, the key generation and authentication platform 104 may overwrite the existing stored IoT vector key with the updated IoT vector key, and may send the updated IoT vector key to the user device 103. For example, the key generation and authentication platform 104 may send the updated IoT vector key to the user device 103 while the second wireless data connection is established.

At step 226, the user device 103 may receive the updated IoT vector key sent at step 226. For example, the user device 103 may receive the updated IoT vector key while the second wireless data connection is established.

At step 227, the user device 103 may route the updated IoT vector key to the wearable device 102. For example, the user device 103 may send the updated IoT vector key to the wearable device 102 while the first wireless data connection is established.

At step 228, the wearable device 102 may receive the updated IoT vector key sent at step 227. For example, the wearable device 102 may receive the updated IoT vector key while the first wireless data connection is established.

At step 229, the wearable device 102 may store the updated IoT vector key. For example, the wearable device 102 may overwrite the previously stored IoT vector key with the updated IoT vector key. In doing so, the hash salt values provided by the wearable device 102 for subsequent application access requests may be continuously changed for increased security.

Figure 2G:
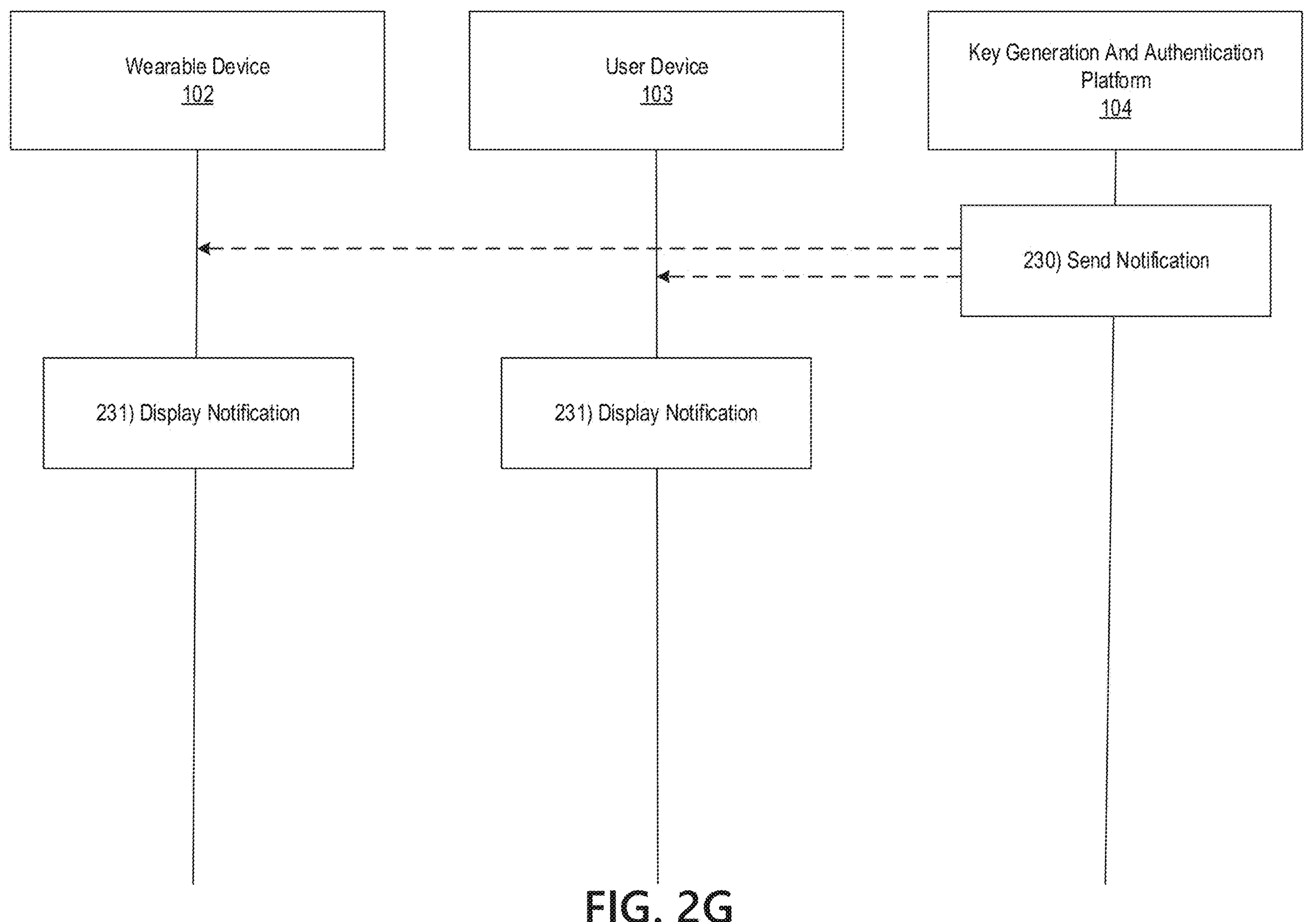

Returning to step 222, if the password hashes do not match, the key generation and authentication platform 104 may proceed to step 230 in FIG. 2G. At step 230, the key generation and authentication platform 104 may send a notification to the wearable device 102 and/or the user device 103 indicating that access is denied. In some instances, the key generation and authentication platform 104 may also send one or more commands directing the wearable device 102 and/or the user device 103 to display the notification.

Figure 4:
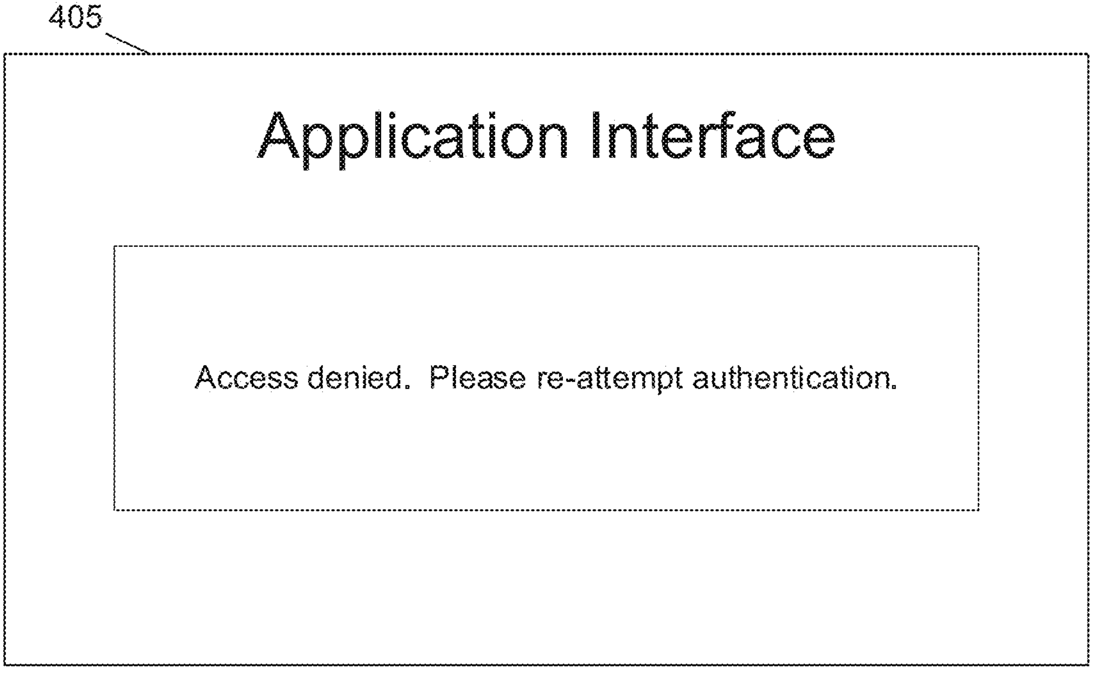
FIG. 4 depicts an illustrative user interface for using a local hash salt to prevent credential stuffing attacks in accordance with one or more example embodiments.

At step 231, based on or in response to the one or more commands directing the wearable device 102 and/or the user device 103 to display the notification, the wearable device 102 and/or the user device 103 may display the notification. For example, the wearable device 102 and/or the user device 103 may display a graphical user interface similar to graphical user interface 405, which is illustrated in FIG. 4.

By operating in this way, users may be able to securely use a single password across a plurality of applications, which may, for example, improve user experience by reducing the number of passwords to be memorized and reducing a number of failed login attempts (and thus corresponding account lockouts). Similarly, these systems and methods may protect against password stuffing attacks by creating different password hashes, based on a user password and unique application hash salt, for each application. Accordingly, even if a user has a common password for multiple applications, and the password is exposed to an attacker, the user's remaining accounts may remain secure against attacks. Additionally, even if a password for a particular application is exposed, the user's account may remain secure against attacks as the attackers might not have access to the unique hash salt, provided by the user's wearable device, needed to authorize access to the application and/or other accounts. This may allow a single password to be used across various applications and/or devices without sacrificing security.

Figure 3:
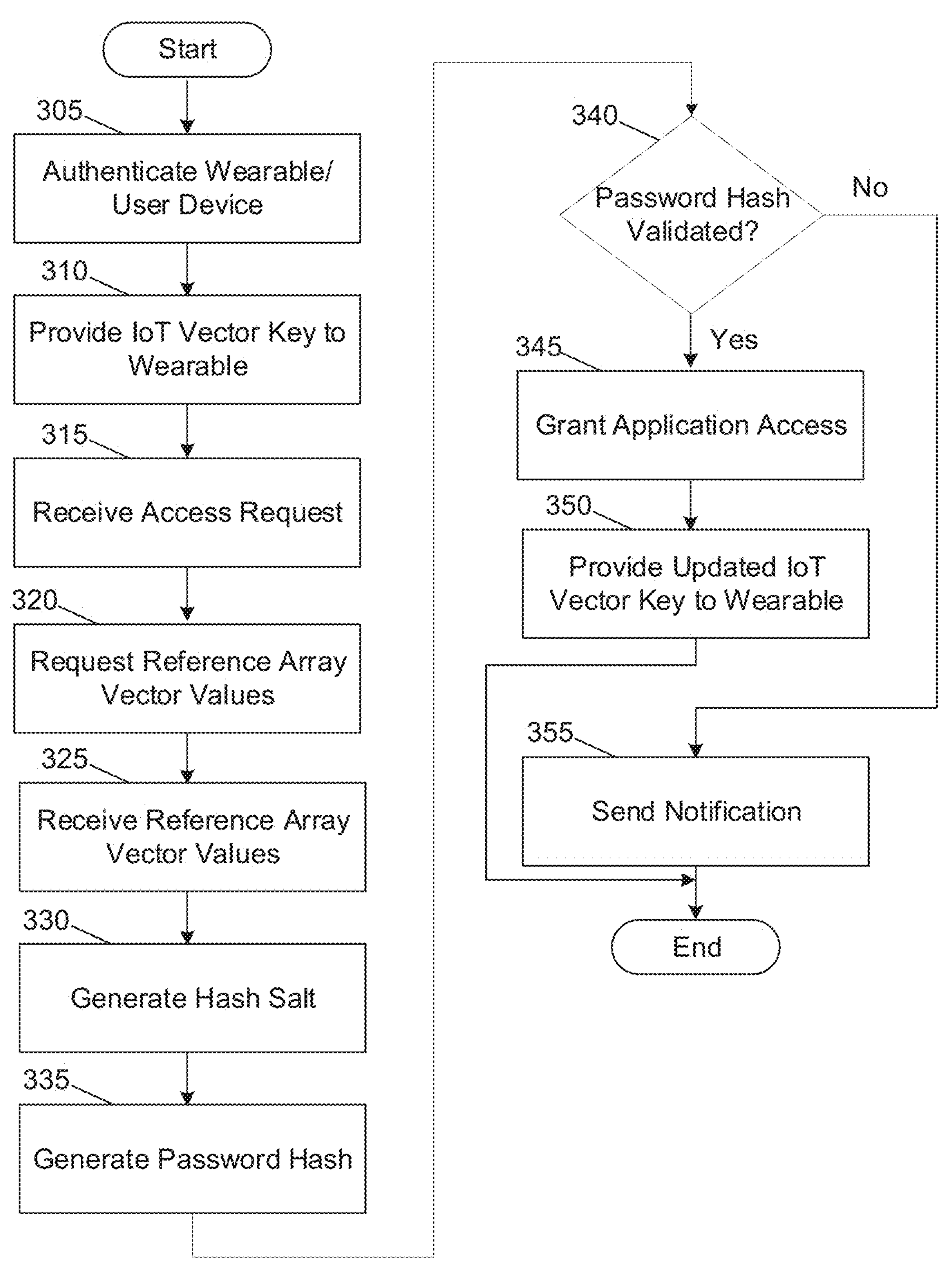
FIG. 3 depicts an illustrative method for using a local hash salt to prevent credential stuffing attacks in accordance with one or more example embodiments.

FIG. 3 depicts an illustrative method for using a local hash salt to prevent credential stuffing attacks in accordance with one or more example embodiments. At step 305, a computing platform may authenticate a wearable device and/or user device. At step 310, the computing platform may provide an IoT vector key to the wearable and user device. At step 315, the computing platform may receive an application access request. At step 320, the computing platform may request reference array vector values. At step 325, the computing platform may receive the reference array vector values. At step 330, the computing platform may generate a hash salt using the reference array vector values. At step 335, the computing platform may generate a password hash based on the hash salt.

At step 340, the computing platform may identify whether or not the password hash is validated. If the password is validated the computing platform may proceed to step 345. At step 345, the computing platform may grant application access. At step 350, the computing platform may provide an updated IoT vector key to the wearable device and/or user device.

Returning to step 340, if the password hash is not validated, the computing platform may proceed to step 355. At step 355, the computing platform may send a notification that access to the application has been denied.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:

at least one processor;

a communication interface communicatively coupled to the at least one processor; and memory storing computer-readable instructions that, when executed by the at least one processor, cause the computing platform to:

send, in response to an application access request and to a wearable device, a reference key comprising a sequence of row-column combinations corresponding to an internet of things (IoT) vector key, wherein the IoT vector key comprises an N×N matrix of values for a client, wherein the wearable device is configured to identify a hash salt value by identifying the values, in the IoT vector key, corresponding to the sequence of row-column combinations defined in the reference key, and wherein:

the reference key is specific to the application, a second reference key is assigned to a second application, the authentication credentials for the application and the second application are the same, and the password hashes for the application and the second application are different;

receive, from the wearable device, the hash salt value;

generate, based on a received hash salt value and authentication credentials received from the wearable device, and using a hashing algorithm, a password hash; and send the password hash to an application server, wherein the application server is configured to validate the password hash by comparing the password hash to a reference password hash and grant the wearable device access to the application based on successful validation, wherein the application server is configured to:

update, after validating the password hash, the IoT vector key, and provide, to the computing platform, the updated IoT vector key, wherein the computing platform distributes the updated IoT vector key to the wearable device for storage and use in subsequent application access requests.

2. The computing platform of claim 1, wherein the IoT vector key is stored at the application server and the wearable device.

3. The computing platform of claim 1, wherein the authentication credentials comprise one or more of: an alphanumeric passcode, biometric input, a retina scan, or a facial scan.

4. The computing platform of claim 1, wherein the reference key is generated by the application server and stored at the application server.

5. The computing platform of claim 1, wherein the application server is configured to generate the reference password hash by:

generating, based on the reference key and the IoT vector key, the hash salt value;

generating, based on the authentication credentials and the hash salt value, the password; and hashing the password to produce the reference password hash.

6. The computing platform of claim 1, wherein the authentication credentials are shared among a plurality of applications accessible at the computing platform.

7. The computing platform of claim 6, wherein a plurality of wearable devices, including the wearable device, may be configured to access the plurality of applications.

8. The computing platform of claim 1, wherein the password hash is further generated based on a second hash salt value, received from a different wearable device.

9. The computing platform of claim 1, wherein the memory stores additional computer-readable instructions that, when executed by the at least one processor, causes the computing platform to:

send, to the wearable device, the IoT vector key.

10. The computing platform of claim 1, wherein the memory stores additional computer-readable instructions that, when executed by the at least one processor, causes the computing platform to:

receive the application access request from the wearable device, wherein the application access request includes the authentication credentials.

11. A method comprising:

at a computing platform comprising at least one processor, a communication interface, and memory:

sending, in response to an application access request and to a wearable device, a reference key comprising a sequence of row-column combinations corresponding to an internet of things (IoT) vector key, wherein the IoT vector key comprises an N×N matrix of values for a client, wherein the wearable device is configured to identify a hash salt value by identifying the values, in the IoT vector key, corresponding to the sequence of row-column combinations defined in the reference key, and wherein:

the reference key is specific to the application, a second reference key is assigned to a second application, the authentication credentials for the application and the second application are the same, and the password hashes for the application and the second application are different;

receiving, from the wearable device, the hash salt value;

generating, based on a received hash salt value and authentication credentials received from the wearable device, and using a hashing algorithm, a password hash; and sending the password hash to an application server, wherein the application server is configured to validate the password hash by comparing the password hash to a reference password hash and grant the wearable device access to the application based on successful validation, wherein the application server is configured to:

update, after validating the password hash, the IoT vector key, and provide, to the computing platform, the updated IoT vector key, wherein the computing platform distributes the updated IoT vector key to the wearable device for storage and use in subsequent application access requests.

12. The method of claim 11, wherein the IoT vector key is stored at the application server and the wearable device.

13. The method of claim 11, wherein the authentication credentials comprise one or more of: an alphanumeric passcode, biometric input, a retina scan, or a facial scan.

14. The method of claim 11, wherein the reference key is generated by the application server and stored at the application server.

15. The method of claim 11, wherein the application server is configured to generate the reference password hash by:

generating, based on the reference key and the IoT vector key, the hash salt value;

generating, based on the authentication credentials and the hash salt value, the password; and hashing the password to produce the reference password hash.

16. The method of claim 11, wherein the authentication credentials are shared among a plurality of applications accessible at the computing platform.

17. The method of claim 16, wherein a plurality of wearable devices, including the wearable device, may be configured to access the plurality of applications.

18. The method of claim 11, wherein the password hash is further generated based on a second hash salt value, received from a different wearable device.

19. One or more non-transitory computer-readable media storing instructions that, when executed by a computing platform comprising at least one processor, a communication interface, and memory, cause the computing platform to:

send, in response to an application access request and to a wearable device, a reference key comprising a sequence of row-column combinations corresponding to an internet of things (IoT) vector key, wherein the IoT vector key comprises an N×N matrix of values for a client, wherein the wearable device is configured to identify a hash salt value by identifying the values, in the IoT vector key, corresponding to the sequence of row-column combinations defined in the reference key, and wherein:

the reference key is specific to the application, a second reference key is assigned to a second application, the authentication credentials for the application and the second application are the same, and the password hashes for the application and the second application are different;

receive, from the wearable device, the hash salt value;

generate, based on a received hash salt value and authentication credentials received from the wearable device, and using a hashing algorithm, a password hash; and send the password hash to an application server, wherein the application server is configured to validate the password hash by comparing the password hash to a reference password hash and grant the wearable device access to the application based on successful validation, wherein the application server is configured to:

update, after validating the password hash, the IoT vector key, and provide, to the computing platform, the updated IoT vector key, wherein the computing platform distributes the updated IoT vector key to the wearable device for storage and use in subsequent application access requests.

* * * * *